United States Patent
Okuyama

(10) Patent No.: US 8,624,479 B2
(45) Date of Patent: Jan. 7, 2014

(54) PLASMA DISPLAY PANEL

(71) Applicant: Panasonic Corporation, Kadoma (JP)

(72) Inventor: Kojiro Okuyama, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/837,388

(22) Filed: Mar. 15, 2013

(65) Prior Publication Data

US 2013/0200775 A1    Aug. 8, 2013

Related U.S. Application Data

(63) Continuation of application No. PCT/JP2012/004332, filed on Jul. 4, 2012.

(30) Foreign Application Priority Data

Jul. 4, 2011 (JP) ................................ 2011-147961

(51) Int. Cl.
*H01J 17/49* (2012.01)

(52) U.S. Cl.
USPC .......................................... 313/487; 313/582

(58) Field of Classification Search
None
See application file for complete search history.

(56) References Cited

U.S. PATENT DOCUMENTS

| 5,998,925 | A | 12/1999 | Shimizu et al. | |
|---|---|---|---|---|
| 6,812,500 | B2 | 11/2004 | Reeh et al. | |
| 8,137,585 | B2 * | 3/2012 | Song et al. | 252/301.4 R |
| 2006/0152135 | A1 | 7/2006 | Choi et al. | |
| 2007/0247066 | A1 | 10/2007 | Tokairin et al. | |
| 2009/0017385 | A1 * | 1/2009 | Harada et al. | 429/255 |
| 2009/0085465 | A1 * | 4/2009 | Hirosaki et al. | 313/503 |
| 2009/0195143 | A1 * | 8/2009 | Song et al. | 313/503 |
| 2009/0244356 | A1 * | 10/2009 | Cheng | 348/345 |
| 2010/0171413 | A1 | 7/2010 | Winkler et al. | |
| 2011/0279998 | A1 | 11/2011 | Su et al. | |

FOREIGN PATENT DOCUMENTS

| JP | 6-103915 | 4/1994 |
|---|---|---|
| JP | 2006-193712 | 7/2006 |

OTHER PUBLICATIONS

Phosphor Research Society ed. "Phosphor Handbook", edited by Keikoutai Dougakkai, published by Ohmsha, Ltd., pp. 12, 237-238, 266-278 & 332, (1987).

* cited by examiner

*Primary Examiner* — Ashok Patel
(74) *Attorney, Agent, or Firm* — Hamre, Schumann, Mueller & Larson, P.C.

(57) ABSTRACT

Provided is a high-efficiency plasma display panel having short decay time and high luminance and color purity. The plasma display panel includes a green phosphor layer emitting visible light when excited with vacuum ultraviolet rays, in which the green phosphor layer is formed of a green phosphor containing 30% by weight or more and 60% by weight or less of a phosphor represented by a general formula: $dZnO.(2-d)MnO.eSiO_2$ ($1.80 \leq d \leq 1.90$, $1.00 \leq e \leq 1.02$) and one of a phosphor represented by a general formula: $aYO_{3/2}.(3-a)CeO_{3/2}.bAlO_{3/2}.cGaO_{3/2}.fWO_3$ ($2.80 \leq a \leq 2.99$, $3.00 \leq b \leq 5.00$, $0 \leq c \leq 2.00$, $0.003 \leq f \leq 0.020$, where $4.00 \leq b+c \leq 5.00$) and a phosphor represented by a general formula: $aYO_{3/2}.(3-a)CeO_{3/2}.bAlO_{3/2}.cGaO_{3/2}.gK_2WO_4$ ($2.80 \leq a \leq 2.99$, $3.00 \leq b \leq 5.00$, $0 \leq c \leq 2.00$, $0.003 \leq g \leq 0.015$, where $4.00 \leq b+c \leq 5.00$).

1 Claim, 1 Drawing Sheet

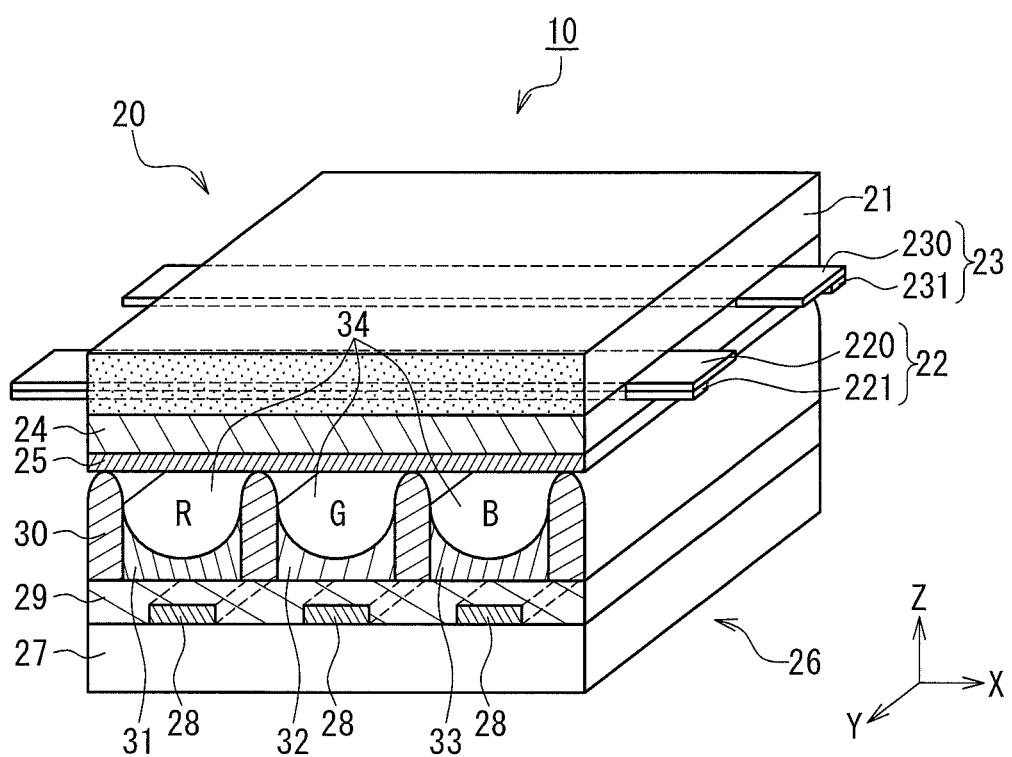

PLASMA DISPLAY PANEL

TECHNICAL FIELD

The present invention relates to a plasma display panel (PDP).

BACKGROUND ART

In recent years, various aluminate phosphors have been put into practical use as PDP phosphors. For example, as a blue phosphor, $BaMgAl_{10}O_{17}$:Eu is used, and as a green phosphor, $(Y, Gd)Al_3B_4O_{12}$:Tb is used as a mixture with $Zn_2SiO_4$:Mn.

However, when a mixture of $(Y, Gd)Al_3B_4O_{12}$:Tb and $Zn_2SiO_4$:Mn or $Zn_2SiO_4$:Mn is used as a green phosphor, the decay time becomes long. Therefore, in the case where a rapidly moving video is displayed, so-called "tailing" occurs, which degrades the moving image display characteristics in a PDP. Further, particularly in a 3D-PDP capable of expressing a stereoscopic video, when the decay time of a phosphor to be used becomes long, there arises a problem in that a satisfactory stereoscopic image cannot be displayed due to moving image crosstalk in which a left eye image and a right eye image switched to be displayed in a short period of time overlap each other. Therefore, in a PDP application, there is a strong demand for a green phosphor whose decay time is short.

In contrast, as a green phosphor, a technology using $Y_3Al_5O_{12}$:Ce whose decay time is remarkably short has been proposed (see Patent Document 1).

PRIOR ART DOCUMENT

Patent Document

Patent document 1: JP 2006-193712 A

DISCLOSURE OF INVENTION

Problems to be Solved by the Invention

However, according to the above-mentioned conventional technology, the luminance decreases although the decay time of a green phosphor can be shortened. Further, a $Y_3Al_5O_{12}$:Ce phosphor has poor color purity, compared with a $Zn_2SiO_4$:Mn phosphor or a $(Y, Gd)Al_3B_4O_{12}$:Tb phosphor, and hence, it is necessary to improve color purity in order to display a satisfactory image through use of a PDP.

The present invention solves the above-mentioned conventional problems, and an object of the present invention is to provide a PDP capable of displaying an image having short decay time, high efficiency, high luminance, and high color purity.

Means for Solving Problem

In order to solve the above-mentioned problems, a PDP of the present invention is a plasma display panel including a green phosphor layer that emits visible light when excited with vacuum ultraviolet rays. The green phosphor layer contains 30% by weight or more and 60% by weight or less of a phosphor represented by a general formula: $dZnO.(2-d)MnO.eSiO_2$ ($1.80 \leq d \leq 1.90$, $1.00 \leq e \leq 1.02$), and one of a phosphor represented by a general formula: $aYO_{3/2}.(3-a)CeO_{3/2}.bAlO_{3/2}.cGaO_{3/2}.fWO_3$ ($2.80 \leq a \leq 2.99$, $3.00 \leq b \leq 5.00$, $0 \leq c \leq 2.00$, $0.003 \leq f \leq 0.020$, where $4.00 \leq b+c \leq 5.00$) and a phosphor represented by a general formula: $aYO_{3/2}.(3-a)CeO_{3/2}.bAlO_{3/2}.cGaO_{3/2}.gK_2WO_4$ ($2.80 \leq a \leq 2.99$, $3.00 \leq b \leq 5.00$, $0 \leq c \leq 2.00$, $0.003 \leq g \leq 0.015$, where $4.00 \leq b+c \leq 5.00$).

Effects of the Invention

According to the present invention, a PDP capable of displaying an image having a short decay time, high efficiency, high luminance, and high color purity can be provided.

BRIEF DESCRIPTION OF DRAWINGS

FIG. 1 A schematic cross-sectional view showing a configuration of a PDP according to an embodiment.

DESCRIPTION OF THE INVENTION

Hereinafter, as one embodiment of a PDP disclosed in the present application, a configuration of an exemplary alternating current surface discharge type PDP is described.

FIG. 1 is a perspective cross-sectional view showing a main structure of an alternating current surface discharge type PDP according to the present embodiment. Regarding the PDP described as the present embodiment, a specific configuration, size, etc. of each portion are shown on the basis of a 42-inch display screen of 1,024×768 pixels. Needless to say, a PDP of the present embodiment may have other sizes and specifications.

As shown in FIG. 1, a PDP 10 according to the present embodiment includes a front panel 20 and a back panel 26, which are arranged so that the respective principal planes are opposed to each other.

The front panel 20 includes a front panel glass 21 as a front substrate, display electrodes (X electrodes 23, Y electrodes 22) in a band shape provided on one principal plane of the front panel glass 21, a front-side dielectric layer 24 with a thickness of 30 μm covering the display electrodes, and a protective layer 25 with a thickness of about 1.0 μm provided on the front-side dielectric layer 24.

The display electrode includes a band-shaped transparent electrode 220 (230) with a thickness of 0.1 μm and a width of 150 μm and a bus line 221 (231) with a thickness of 7 μm and a width of 95 μm provided so as to overlap the transparent electrode. Further, each pair of display electrodes (X electrode 23, Y electrode 22) is arranged in a plural number in a y-axis direction, with an x-axis direction being a longitudinal direction.

Further, each pair of display electrodes (X electrode 23, Y electrode 22) is electrically connected to a panel driving circuit (not shown) in the vicinity of ends in a right-left direction (y-axis direction) of the front panel glass 21. The Y electrodes 22 are connected to the panel driving circuit in a collective manner, and the X electrodes 23 are respectively independently connected to the panel driving circuit. When the Y electrode 22 and a given electrode 23 are supplied with electricity through use of the panel driving circuit, surface discharge (sustain discharge) occurs in a gap (about 80 μm) between the X electrode 23 and the Y electrode 22. The X electrode 23 also can be operated as a scan electrode, whereby writing discharge (address discharge) is allowed to occur between the X electrode 23 and address electrodes 28 (described later).

The back panel 26 includes a back panel glass 27 as a back substrate, a plurality of address electrodes 28, a back side dielectric layer 29, partition walls 30, and phosphor layers 31 to 33 corresponding to any of red (R), green (G), and blue (B). The phosphor layers 31 to 33 are provided in contact with side walls of the two adjacent partition walls 30 and the back side dielectric layer 29 between the side walls so that the y-axis direction becomes a longitudinal direction. Further, a plurality of groups of the phosphor layers 31 to 33 is arranged repeatedly in the x-axis direction.

The green phosphor layer (G) is configured so as to contain 30% by weight or more and 60% by weight or less of a phosphor represented by a general formula: $dZnO.(2-d)MnO.eSiO_2$ ($1.80 \leq d \leq 1.90$, $1.00 \leq e \leq 1.02$), and one of a phosphor represented by a general formula: $aYO_{3/2}.(3-a)CeO_{3/2}.bAlO_{3/2}.cGaO_{3/2}.fWO_3$ ($2.80 \leq a \leq 2.99$, $3.00 \leq b \leq 5.00$, $0 \leq c \leq 2.00$, $0.003 \leq f \leq 0.020$, where $4.00 \leq b+c \leq 5.00$) and a phosphor represented by a general formula: $aYO_{3/2}.(3-a)CeO_{3/2}.bAlO_{3/2}.cGaO_{3/2}.gK_2WO_4$ ($2.80 \leq a \leq 2.99$, $3.00 \leq b \leq 5.00$, $0 \leq c \leq 2.00$, $0.003 \leq g \leq 0.015$, where $4.00 \leq b+c \leq 5.00$). Further, the red phosphor layer (R) and the blue phosphor layer (B) are respectively formed of general phosphors. For example, as a red phosphor, $Y(P, V)O_4$:Eu and $Y_2O_3$:Eu or $(Y, Gd)BO_3$:Eu can be used, and as a blue phosphor, $BaMgAl_{10}O_{17}$:Eu can be used.

Each phosphor layer can be formed by coating the partition walls 30 and the back side dielectric layer 29 with phosphor ink in which phosphor particles are dissolved, for example, by a known coating method such as a meniscus method or a line-jet method, followed by drying and firing (for example, 10 minutes at 500° C.). The phosphor ink can be prepared by mixing 30% by mass of a green phosphor having a volume average particle diameter of 2 μm, 4.5% by mass of ethyl cellulose having a weight average molecular weight of about 200,000, and 65.5% by mass of butylcarbitol acetate. Further, it is preferred that the viscosity of the phosphor ink be set to about 2,000 to 6,000 cps (2 to 6 Pas) finally because the adhesive strength of the ink with respect to the partition walls 30 can be enhanced.

The address electrodes 28 are provided on one principal plane of the back panel glass 27. Further, the back side dielectric layer 29 is provided so as to cover the address electrodes 28. Further, the partition walls 30 have a height of about 150 μm and a width of about 40 μm, as an example, and the partition walls 30 are arranged on the back side dielectric layer 29 in accordance with a pitch between the adjacent address electrodes 28, with the y-axis direction being a longitudinal direction.

The address electrodes 28 respectively have a thickness of 5 μm and a width of 60 μm, and the address electrodes 28 are arranged in a plural number in the x-axis direction, with the y-axis direction being a longitudinal direction. Further, the address electrodes 28 are arranged so that a pitch thereof becomes a predetermined interval (about 150 μm). The plurality of address electrodes 28 is connected to the panel driving circuit respectively and independently. By supplying electricity to each address electrode, address discharge is allowed to occur between a given address electrode 28 and a given X electrode 23.

The front panel 20 and the back panel 26 are disposed in such a manner that the address electrodes 28 and the display electrodes are orthogonal to each other. The front panel 20 and the back panel 26 are sealed airtightly with a frit glass sealing portion (not shown) as a sealing member placed so as to surround a circumferential portion.

In an airtight space between the front panel 20 and the back panel 26 sealed with the frit glass sealing portion, a discharge gas formed of rare gas components such as He, Xe, and Ne is sealed under a predetermined pressure (generally, about $6.7 \times 10^4$ to $1.0 \times 10^5$ Pa).

A space corresponding to a region between the two adjacent partition walls 30 serves as a discharge space 34. Further, a region where a pair of display electrodes and one address electrode 28 cross each other with the discharge space 34 interposed therebetween corresponds to a cell for displaying an image. In the PDP 10 according to the present embodiment, a cell pitch in the x-axis direction is set to about 300 μm, and a cell pitch in the y-axis direction is set to about 675 μm.

Further, when the PDP 10 is driven, a pulse voltage is applied across the given address electrode 28 and the given X electrode 23 with the pulse driving circuit to generate address discharge, and thereafter, a pulse is applied across the pair of display electrodes (X electrode 23, Y electrode 22) to generate sustain discharge. A predetermined image can be displayed on the front panel 20 side by causing phosphors contained in the phosphor layers 31 to 33 to emit visible light through use of ultraviolet rays (as an example, a resonance line whose center wavelength is about 147 nm and a molecular beam whose center wavelength is 172 nm) having a short wavelength generated by the sustain discharge.

Next, a green phosphor layer used in the PDP according to the present embodiment is described.

The green phosphor layer used in the PDP 10 of the present embodiment contains, as a first phosphor, a phosphor represented by the general formula: $aYO_{3/2}.(3-a)CeO_{3/2}.bAlO_{3/2}.cGaO_{3/2}.fWO_3$ ($2.80 \leq a \leq 2.99$, $3.00 \leq b \leq 5.00$, $0 \leq c \leq 2.00$, $0.003 \leq f \leq 0.020$, where $4.00 \leq b+c \leq 5.00$). In the above-mentioned general formula, a preferred range of "a" is $2.97 \leq a \leq 2.99$ from the viewpoint of luminance.

Further, the green phosphor layer contains, as a second phosphor, 30% by weight or more and 60% by weight or less of a phosphor represented by the general formula: $dZnO.(2-d)MnO.eSiO_2$ ($1.80 \leq d \leq 1.90$, $1.00 \leq e \leq 1.02$). In the above-mentioned general formula, a preferred range of "d" is $1.82 \leq d \leq 1.88$ from the viewpoint of luminance and decay time.

Further, the green phosphor layer used in the PDP 10 of the present embodiment may contain, as the first phosphor, a phosphor represented by the general formula: $aYO_{3/2}.(3-a)CeO_{3/2}.bAlO_{3/2}.cGaO_{3/2}.gK_2WO_4$ ($2.80 \leq a \leq 2.99$, $3.00 \leq b \leq 5.00$, $0 \leq c \leq 2.00$, $0.003 \leq g \leq 0.015$, where $4.00 \leq b+c \leq 5.00$) instead of a phosphor having the above-mentioned composition. In the above-mentioned general formula, a preferred range of "a" is $2.97 \leq a \leq 2.99$ from the viewpoint of luminance.

Further, even in this case, the green phosphor layer used in the PDP 10 according to the present embodiment contains, as a second phosphor, 30% by weight or more and 60% by weight or less of a phosphor represented by the general formula $dZnO.(2-d)MnO.eSiO_2$ ($1.80 \leq d \leq 1.90$, $1.00 \leq e \leq 1.02$) in the addition to the first phosphor. In the above-mentioned general formula, a preferred range of "d" is $1.82 \leq d \leq 1.88$ from the viewpoint of luminance and decay time.

Next, a method for producing a green phosphor used in the PDP of the present embodiment is described. The following description is made merely for the purpose of illustrating a method for producing a green phosphor, and the method for producing a green phosphor disclosed in the present application is not limited to the method described below.

As materials, compounds that become oxides by sintering, such as a hydroxide, a carbonate, and a nitrate of high purity (purity: 99% or more) containing elements constituting a green phosphor to be used, or oxides of high purity (purity: 99% or more) can be used.

Further, in order to accelerate a reaction, it is preferred that a small amount of a fluoride (aluminum fluoride, etc.) or a chloride (zinc chloride, etc.) be added.

A phosphor is produced by mixing the above-mentioned materials, followed by sintering, and as a method for mixing the materials, wet mixing in a solution or dry mixing of dry powder may be used. Well-known agitation and mixing means, generally used industrially, such as a ball mill, a medium agitation mill, a planetary mill, a vibrating mill, a jet mill, a V-type mixer, and an agitator can be used.

A method for sintering mixed powder varies depending upon a composition system of a phosphor. Of the first phosphors constituting the green phosphor layer in the present embodiment, a phosphor represented by the general formula: $aYO_{3/2} \cdot (3-a)CeO_{3/2} \cdot bAlO_{3/2} \cdot cGaO_{3/2} \cdot fWO_3$ is sintered in a temperature range of 1,200° C. to 1,400° C. for about 1 to 50 hours in an atmosphere of a given oxygen partial pressure formed by nitrogen gas or carbon dioxide gas containing 0 to 50% by volume of nitrogen. The second phosphor constituting the green phosphor layer in the present embodiment is sintered in a temperature range of 1,100° C. to 1,300° C. for 1 to 10 hours in carbon dioxide containing 0 to 50% by volume of nitrogen.

In the case of the phosphor represented by the general formula: $aYO_{3/2} \cdot (3-a)CeO_{3/2} \cdot bAlO_{3/2} \cdot cGaO_{3/2} \cdot gK_2WO_4$ used as the first phosphor, first, the phosphor is sintered in a temperature range of 1,100° C. to 1,300° C. for about 1 to 50 hours in the atmosphere, and further is sintered in a temperature range of 1,200° C. to 1,400° C. for about 1 to 50 hours in an atmosphere of a given oxygen partial pressure formed by nitrogen gas or carbon dioxide containing 0 to 50% by volume of nitrogen.

As a furnace used for sintering, a furnace that is generally used for industrial purposes can be used, and a continuous electric furnace such as a pusher furnace or a batch-type electric furnace, and further, a gas furnace can be used.

The phosphor powder obtained as a result of sintering is crushed again with a ball mill or a jet mill, and washed or classified, if required, whereby a granular variation and flowability of the phosphor powder can be adjusted.

As described above, the green phosphor layer used in the PDP disclosed in the present application uses, as the first phosphor, the phosphor represented by the general formula: $aYO_{3/2} \cdot (3-a)CeO_{3/2} \cdot bAlO_{3/2} \cdot cGaO_{3/2} \cdot fWO_3$ or the phosphor represented by the general formula: $aYO_{3/2} \cdot (3-a)CeO_{3/2} \cdot bAlO_{3/2} \cdot cGaO_{3/2} \cdot gK_2WO_4$, and contains, as the second phosphor, 30% by weight or more and 60% by weight or less of the phosphor represented by the general formula: $dZnO \cdot (2-d)MnO \cdot eSiO_2$. Therefore, compared with a PDP including, as a green phosphor layer, a phosphor layer using a conventional green phosphor such as $Y_3Al_5O_{12}:Ce$, the PDP disclosed in the present application can include a green phosphor layer having a short decay time, which also can be applied to a 3D-PDP having high luminance, high color purity, and high efficiency, and being capable of expressing a stereoscopic video.

Hereinafter, regarding the green phosphor layer used in the PDP according to the present embodiment, characteristics obtained in the case of changing the respective compositions of the first and second phosphors and the mixing ratio between the first and second phosphors are described in detail by way of specific examples and comparative examples for comparison with the examples.

<Production of a First Phosphor Sample>

[Phosphor Represented by the General Formula: $aYO_{3/2} \cdot (3-a)CeO_{3/2} \cdot bAlO_{3/2} \cdot cGaO_{3/2} \cdot fWO_3$]

$Y_2O_3$, $Al_2O_3$, $Ga_2O_3$, $CeO_2$, and $WO_3$ were used as starting materials. The materials were weighed so as to obtain a predetermined composition and subjected to wet mixing in pure water through use of a ball mill. The mixture thus obtained was dried, and thereafter, was sintered at 1,200° C. for four hours in carbon dioxide containing 0 to 50% by volume of nitrogen to obtain a phosphor.

Further, the phosphor powder thus obtained was crushed again through use of the ball mill to adjust a particle size distribution.

Phosphor samples corresponding to examples and comparative examples, in which numerical values of a, b, c, and f in the above-mentioned general formula were varied, were measured for luminance (Y) and chromaticity (x, y). The luminance (Y) was measured by irradiating the respective phosphor samples with vacuum ultraviolet rays having a wavelength of 146 nm in vacuum, and measuring emitted light in a visible area.

Table 1 shows composition ratios of the produced phosphors and measurement results of the luminance (Y) and the chromaticity (x, y).

Y represents luminance Y in an XYZ color specification system of Commission Internationale de l'Eclairage, which is a relative value in the case of setting a Y value to be 100 in a phosphor created as Sample No. 1 where a=2.80, 13=5.00, c=0, and f=0. In Table 1, samples with a symbol "*" attached to Sample Nos. are phosphors corresponding to the comparative examples out of the range of the composition of the green phosphor disclosed in the present application.

TABLE 1

| Sample No. | a | b | c | f | Y (%) | x | y |
|---|---|---|---|---|---|---|---|
| *1 | 2.80 | 5.00 | 0 | 0 | 100 | 0.433 | 0.544 |
| *2 | 2.70 | 5.20 | 0 | 0 | 78 | 0.425 | 0.532 |
| *3 | 2.80 | 0.50 | 4.00 | 0 | 43 | 0.403 | 0.485 |
| *4 | 2.80 | 5.00 | 0 | 0.050 | 89 | 0.402 | 0.532 |
| 5 | 2.80 | 5.00 | 0 | 0.020 | 112 | 0.395 | 0.545 |
| 6 | 2.99 | 5.00 | 0 | 0.003 | 118 | 0.387 | 0.558 |
| 7 | 2.97 | 3.00 | 2.00 | 0.010 | 142 | 0.325 | 0.520 |
| 8 | 2.97 | 4.00 | 1.00 | 0.005 | 148 | 0.340 | 0.548 |
| 9 | 2.98 | 3.90 | 1.10 | 0.005 | 155 | 0.335 | 0.545 |

As is apparent from Table 1, it can be confirmed that for the phosphors (Sample Nos. 5 to 9) as the examples whose composition ratios are within the composition range of the green phosphor disclosed in the present application, the luminance obtained as a result of excitation by vacuum ultraviolet rays is high and color purity of green emitted light is improved (x value of chromaticity is small, and y value thereof is large). Above all, in the phosphors (Sample Nos. 6 to 9) whose composition ratios are within the composition range of $2.97 \leq a \leq 2.99$, luminance is particularly high.

The phosphor samples that are examples of Sample Nos. 5 to 9 were pulse-irradiated with vacuum ultraviolet rays having a wavelength of 146 nm in vacuum, and time during which emission intensity in a visible area is attenuated to 1/10 (1/10 decay time) was measured. As a result, it was confirmed that afterglow characteristics were excellent (0.5 milliseconds or less) in any of the phosphor samples.

[Phosphor Represented by the General Formula: $aYO_{3/2} \cdot (3-a)CeO_{3/2} \cdot bAlO_{3/2} \cdot cGaO_{3/2} \cdot gK_2WO_4$]

$Y_2O_3$, $Al_2O_3$, $Ga_2O_3$, $CeO_2$, and $K_2WO_4$ were used as starting materials. The materials were weighed so as to obtain a predetermined composition and subjected to wet mixing in pure water through use of a ball mill. The mixture thus obtained was dried. After that, the mixture was sintered at 1,200° C. for four hours in the atmosphere, and further, was sintered in a temperature range of 1,200° C. to 1,400° C. for four hours in nitrogen gas or carbon dioxide containing 0 to 50% by volume of nitrogen to obtain a phosphor.

The phosphor powder thus obtained was crushed again through use of the ball mill to adjust a particle size distribution.

Phosphor samples corresponding to examples and comparative examples, in which numerical values of a, b, c, and g in the above-mentioned general formula were varied, were measured for luminance (Y) and chromaticity (x, y).

Table 2 shows composition ratios of the produced phosphors and measurement results of the luminance (Y) and the chromaticity (x, y). Y represents a relative value with respect to luminance Y of the phosphor of Sample No. 1 in Table 1, and a sample with a symbol "*" attached to Sample No. in Table 2 is a sample corresponding to a comparative example out of the range of the composition of the green phosphor disclosed in the present application.

TABLE 2

| Sample No. | a | b | c | g | Y (%) | x | y |
|---|---|---|---|---|---|---|---|
| *18 | 2.80 | 5.00 | 0 | 0.040 | 76 | 0.409 | 0.515 |
| 19 | 2.80 | 5.00 | 0 | 0.015 | 118 | 0.390 | 0.554 |
| 20 | 2.99 | 5.00 | 0 | 0.003 | 122 | 0.386 | 0.552 |
| 21 | 2.97 | 3.00 | 2.00 | 0.010 | 148 | 0.320 | 0.535 |
| 22 | 2.97 | 4.00 | 1.00 | 0.005 | 152 | 0.335 | 0.554 |
| 23 | 2.98 | 3.90 | 1.10 | 0.005 | 159 | 0.324 | 0.558 |

As is apparent from Table 2, in the phosphors (Sample Nos. 19 to 23) as the examples whose composition ratios are within the range of the composition of the green phosphor disclosed in the present application, the luminance obtained as a result of excitation by vacuum ultraviolet rays is high, and color purity of green emitted light is improved (x value of chromaticity is small, and y value thereof is large). Above all, in the phosphors (Sample Nos. 20 to 23) whose composition ratios are within the range of the composition of $2.97 \leq a \leq 2.99$, luminance is particularly high.

The phosphor samples that are examples of Sample Nos. 19 to 23 were pulse-irradiated with vacuum ultraviolet rays having a wavelength of 146 nm in vacuum, and the time during which emission intensity in a visible area is attenuated to 1/10 (1/10 decay time) was measured. As a result, it was confirmed that afterglow characteristics were excellent (0.5 milliseconds or less) in any of the phosphor samples.

<Production of a Second Phosphor Sample>

ZnO, $MnCO_3$, and $SiO_2$ were used as starting materials. The materials were weighed so as to obtain a predetermined composition and subjected to wet mixing in pure water through use of a ball mill. The mixture thus obtained was dried, and thereafter, the mixture was sintered in a temperature range of 1,100° C. to 1,300° C. for four hours in carbon dioxide containing 0 to 50% by volume of nitrogen to obtain a phosphor.

Table 3 shows composition ratios represented by numerical values d and e of the produced phosphors, and measurement results of luminance (Y) and 1/10 decay time of the samples in the above-mentioned measurement method. Similarly to Tables 1 and 2, Y represents a relative value with respect to luminance Y of the phosphor of Sample No. 1 in Table 1. Further, also in Table 3, samples corresponding to comparative examples out of the range of the composition of the green phosphor disclosed in the present application are provided with a symbol "*" attached to Sample Nos.

TABLE 3

| Sample No. | d | e | Y (%) | Decay time (ms) |
|---|---|---|---|---|
| *10 | 1.70 | 1.00 | 45 | 3.8 |
| *11 | 1.95 | 1.00 | 85 | 16.8 |
| *12 | 1.84 | 0.90 | 52 | 9.8 |
| *13 | 1.84 | 1.10 | 96 | 7.6 |
| 14 | 1.80 | 1.00 | 106 | 3.2 |
| 15 | 1.90 | 1.02 | 118 | 6.8 |
| 16 | 1.84 | 1.00 | 110 | 3.5 |
| 17 | 1.82 | 1.01 | 108 | 3.4 |

As is apparent from Table 3, in the phosphors (Sample Nos. 14 to 17) as the examples whose composition ratios are within the range of the composition of the green phosphor disclosed in the present application, luminance obtained as a result of excitation of vacuum ultraviolet rays is high, and 1/10 decay time is relatively short.

Any chromaticity (x, y) of the phosphor samples as the examples represented by Sample Nos. 14 to 17 shown in Table 3 was within the range of (0.230, 0.700) to (0.240, 0.710), and thus, it was confirmed that color purity was very high.

<Measurement of Luminance, Chromaticity, and Decay Time of a Panel>

Green phosphor layers of an alternating current surface discharge type PDP having the configuration illustrated in FIG. 1 were produced by selecting and using, as a first phosphor constituting a green phosphor layer, the phosphors represented by Sample Nos. 1, 7, and 9 in Table 1, and the phosphors represented by Sample Nos. 21 and 23 in Table 2, using, as a second phosphor, the phosphor represented by Sample No. 17 in Table 3, and varying a mixed ratio. The PDPs thus produced were measured for panel initial luminance and chromaticity, and 1/10 decay time.

Table 4 shows measurement results. Note that panel initial luminance is represented by a relative value with luminance in the case of constituting a green phosphor layer through use of only the phosphor of Sample No. 1 being set to 100. Further, the panels were measured as a fixed display of one green color. Also in Table 4, the samples with a symbol "*" attached thereto are phosphors corresponding to the comparative examples out of the range of the composition of the green phosphor disclosed in the present application.

TABLE 4

| | | | Panel characteristics | | | |
|---|---|---|---|---|---|---|
| Sample No. | Sample No. of used phosphor and % by weight | | Luminance (%) | x | y | Decay time (ms) |
| *24 | Sample No. 1 | 100% by weight | 100 | 0.442 | 0.548 | 0.5 |
| *25 | Sample No. 17 | 100% by weight | 80 | 0.235 | 0.704 | 3.4 |
| *26 | Sample No. 1 | 70% by weight | 84 | 0.345 | 0.598 | 3.0 |
| | Sample No. 17 | 30% by weight | | | | |
| 27 | Sample No. 7 | 70% by weight | 125 | 0.335 | 0.615 | 2.6 |
| | Sample No. 17 | 30% by weight | | | | |

TABLE 4-continued

| Sample No. | Sample No. of used phosphor and % by weight | | Panel characteristics | | | |
|---|---|---|---|---|---|---|
| | | | Luminance (%) | x | y | Decay time (ms) |
| 28 | Sample No. 9 | 70% by weight | 137 | 0.317 | 0.635 | 2.4 |
| | Sample No. 17 | 30% by weight | | | | |
| 29 | Sample No. 9 | 40% by weight | 119 | 0.296 | 0.667 | 2.7 |
| | Sample No. 17 | 60% by weight | | | | |
| *30 | Sample No. 9 | 20% by weight | 92 | 0.270 | 0.685 | 3.5 |
| | Sample No. 17 | 80% by weight | | | | |
| 31 | Sample No. 21 | 70% by weight | 130 | 0.330 | 0.622 | 2.5 |
| | Sample No. 17 | 30% by weight | | | | |
| 32 | Sample No. 23 | 70% by weight | 144 | 0.309 | 0.642 | 2.4 |
| | Sample No. 17 | 30% by weight | | | | |
| 33 | Sample No. 23 | 40% by weight | 123 | 0.294 | 0.682 | 2.6 |
| | Sample No. 17 | 60% by weight | | | | |

As is apparent from Table 4, it was confirmed that panel luminance is improved without degrading color purity and afterglow characteristics remarkably by mixing the second phosphor in a range of 30% by weight to 60% by weight in addition to the first phosphor to form a green phosphor layer. In particular, it was confirmed that panel luminance is improved remarkably through use of the second phosphor represented by the general formula: $dZnO \cdot (2-d)MnO \cdot eSiO_2$ in addition to the phosphor represented by the general formula: $aYO_{3/2} \cdot (3-a)CeO_{3/2} \cdot bAlO_{3/2} \cdot cGaO_{3/2} \cdot gK_2WO_4$.

It is not preferred that the mixed amount of the second phosphor be 10% by weight or less because the effect of improvement of color purity cannot be recognized. Further, it is not preferred, either, that the mixed amount of the second phosphor be 80% by weight or more because panel luminance is degraded remarkably.

INDUSTRIAL APPLICABILITY

As disclosed in the present application, a high-efficiency plasma display panel having short decay time and high luminance and color purity can be provided when a green phosphor layer uses, as a first phosphor, a phosphor represented by the general formula: $aYO_{3/2} \cdot (3-a)CeO_{3/2} \cdot bAlO_{3/2} \cdot cGaO_{3/2} \cdot fWO_3$ or a phosphor represented by the general formula: $aYO_{3/2} \cdot (3-a)CeO_{3/2} \cdot bAlO_{3/2} \cdot cGaO_{3/2} \cdot gK_2WO_4$, and further, contains, as a second phosphor, a phosphor represented by the general formula: $dZnO \cdot (2-d)MnO \cdot eSiO_2$, in an amount of 30% by weight or more and 60% by weight or less.

The invention claimed is:

1. A plasma display panel comprising a green phosphor layer emitting visible light when excited with vacuum ultraviolet rays, wherein the green phosphor layer is formed of a green phosphor containing 30% by weight or more and 60% by weight or less of a phosphor represented by a general formula: $dZnO \cdot (2-d)MnO \cdot eSiO_2$ ($1.80 \leq d \leq 1.90$, $1.00 \leq e \leq 1.02$) and one of a phosphor represented by a general formula: $aYO_{3/2} \cdot (3-a)CeO_{3/2} \cdot bAlO_{3/2} \cdot cGaO_{3/2} \cdot fWO_3$ ($2.80 \leq a \leq 2.99$, $3.00 \leq b \leq 5.00$, $0 \leq c \leq 2.00$, $0.003 \leq f \leq 0.020$, where $4.00 \leq b+c \leq 5.00$) and a phosphor represented by a general formula: $aYO_{3/2} \cdot (3-a)CeO_{3/2} \cdot bAlO_{3/2} \cdot cGaO_{3/2} \cdot gK_2WO_4$ ($2.80 \leq a \leq 2.99$, $3.00 \leq b \leq 5.00$, $0 \leq c \leq 2.00$, $0.003 \leq g \leq 0.015$, where $4.00 \leq b+c \leq 5.00$).

* * * * *